United States Patent [19]
Armstrong et al.

[11] Patent Number: 5,681,118
[45] Date of Patent: Oct. 28, 1997

[54] RETAINER BETWEEN A SHAFT AND BEARING

[75] Inventors: Ray Garnet Armstrong, Bay City; Richard Kremer Riefe, Saginaw, both of Mich.

[73] Assignee: General Motors Corporation, Detroit, Mich.

[21] Appl. No.: 715,151

[22] Filed: Sep. 17, 1996

[51] Int. Cl.$^6$ .................................................... F16C 33/58
[52] U.S. Cl. .......................... 384/513; 384/536; 384/538
[58] Field of Search .................................. 384/513, 536, 384/538, 569, 582, 585

[56] References Cited

U.S. PATENT DOCUMENTS

| | | |
|---|---|---|
| 1,418,379 | 6/1922 | Karle . |
| 1,810,093 | 6/1931 | Timson . |
| 3,832,076 | 8/1974 | Gehrke ................................... 403/359 |
| 3,992,117 | 11/1976 | Ristau ...................................... 403/14 |
| 4,344,658 | 8/1982 | Ledgerwood, III . |
| 4,351,450 | 9/1982 | Summerfield ........................... 220/319 |
| 5,193,917 | 3/1993 | Adler et al. ............................. 384/536 |

OTHER PUBLICATIONS

P. 320 of an unidentified textbook describing the mechanics of friction (no date).

*Primary Examiner*—Lenard A. Footland
*Attorney, Agent, or Firm*—Saul Schwartz

[57] ABSTRACT

A retainer for preventing dislodgment of a shaft from a bearing including a radially expandable retaining ring, a circumferential groove in the shaft having a frustoconical side, and a frustoconical sidewall on an inner race of the bearing facing the frustoconical side of the groove in the shaft and cooperating therewith in defining an annular V-shaped retaining ring groove. In a seated position of the retaining ring in the retaining ring groove, the retaining ring is wedged between the frustoconical sidewall of the bearing inner race and the frustoconical side of the groove in the shaft to eliminate lash between the shaft and the bearing. To prevent the retaining ring from being squeezed out of the V-shaped retaining ring groove by a force on the shaft in the direction of its longitudinal centerline, the angle of convergence between the sides of the V-shaped retaining ring groove is selected from a range of angles whose tangent is less than the static coefficient of friction between the retaining ring, the frustoconical sidewall of the bearing inner race, and the frustoconical side of the groove in the shaft.

3 Claims, 3 Drawing Sheets

5,681,118

RETAINER BETWEEN A SHAFT AND BEARING

TECHNICAL FIELD

This invention relates to a retainer for preventing dislodgment of a shaft from a bearing.

BACKGROUND OF THE INVENTION

U.S. Pat. No. 1,418,379 describes a retainer for preventing dislodgment of a shaft from a bearing including a circumferential groove in the shaft having a substantially semi-circular cross section, an annular sidewall on an inner race of the bearing in a plane perpendicular to a longitudinal centerline of the shaft, and a radially expandable retaining ring in the circumferential groove. A restoring force induced by radially expanding the retaining ring and releasing it in the circumferential groove wedges the ring between the sidewall of the bearing inner race and an opposite side of the annular groove to prevent dislodgment of the shaft from the bearing and to eliminate lash between the bearing and the shaft.

SUMMARY OF THE INVENTION

This invention is a new and improved retainer for preventing dislodgment of a shaft from a bearing including a radially expandable retaining ring, a circumferential groove in the shaft having a frustoconical side, and a frustoconical sidewall on an inner race of the bearing facing the frustoconical side of the groove in the shaft and cooperating therewith in defining an annular V-shaped retaining ring groove. In a seated position of the retaining ring in the retaining ring groove, the retaining ring is wedged between the frustoconical sidewall of the bearing inner race and the frustoconical side of the groove in the shaft to eliminate lash between the shaft and the bearing. To prevent the retaining ring from being squeezed out of the V-shaped retaining ring groove by a force on the shaft in the direction of its longitudinal centerline, the angle of convergence between the sides of the V-shaped retaining ring groove is selected from a range of angles whose tangents are less than the static coefficient of friction between the retaining ring, the frustoconical sidewall of the bearing inner race, and the frustoconical side of the groove in the shaft. With an angle of convergence in the aforesaid range, friction between the retaining ring, the frustoconical sidewall of the bearing inner race, and the frustoconical side of the groove in the shaft exceeds the magnitude of forces urging expansion of the retaining ring in the V-shaped retaining ring groove.

DESCRIPTION OF THE PREFERRED EMBODIMENT

Figure 1:
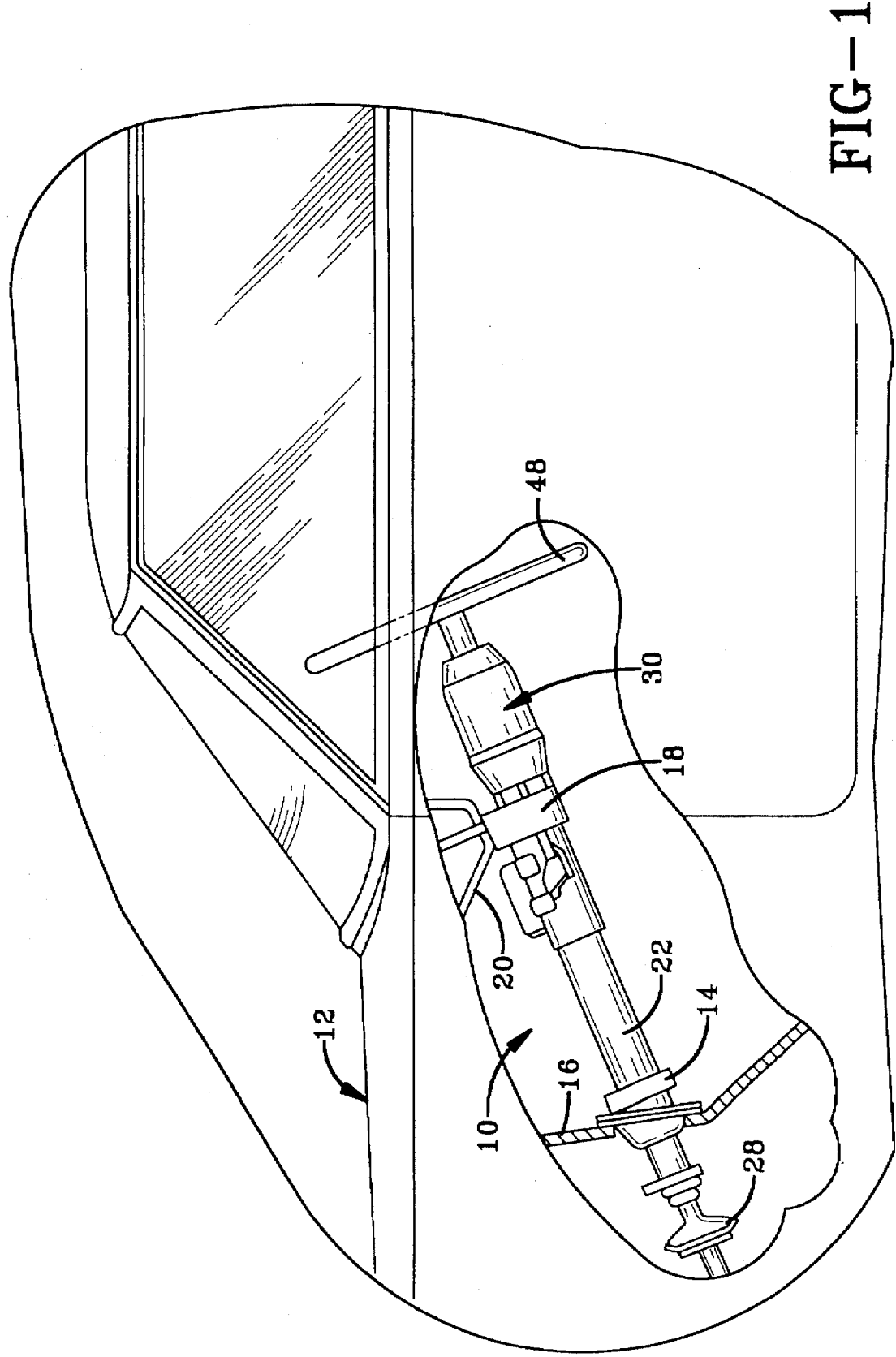
FIG. 1 is a fragmentary, broken-away view of a motor vehicle having a steering column in which a bearing is retained on a shaft by a retainer according to this invention.

Referring to FIG. 1, a steering column 10 of a motor vehicle 12 is attached to a body of the vehicle in a passenger compartment thereof through a lower mount 14 between the steering column and a vertical panel 16 of the body and an upper mount 18 between the steering column and a bracket 20 on the body. The steering column 10 includes a tubular mast jacket 22 and a steering shaft 24, FIG. 2, supported on the mast jacket for rotation about a longitudinal centerline 26 of the steering column. Outside of the passenger compartment, the steering shaft 24 is connected to a steering gear through a flexible coupling 28.

Figure 2:
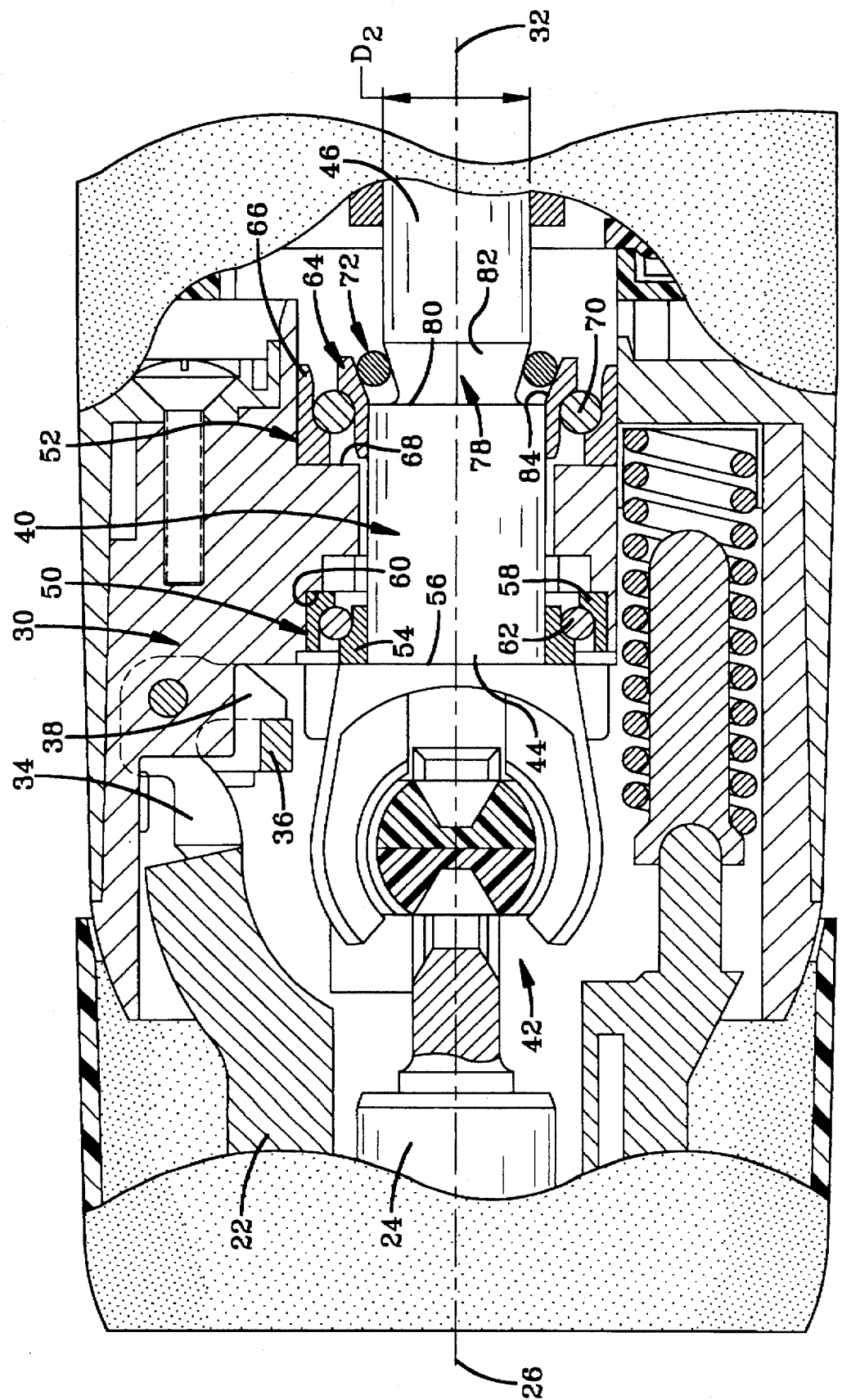
FIG. 2 is an enlarged, partially broken-away view of a portion of FIG. 1.

As seen best in FIG. 2, a tilt housing 30 of the steering column 10 is mounted on the mast jacket 22 for up and down pivotal movement about a lateral centerline of the steering column perpendicular to the longitudinal centerline 26. A longitudinal centerline 32 of the tilt housing 30 coincides with the centerline 26 of the steering column 10 in a middle position of the tilt housing 30, FIGS. 1–2. A lock shoe 34 pivotally supported on the tilt housing 30 cooperates with a rigid pin, not shown, on the mast jacket to capture the position of the tilt housing relative to the mast jacket. A lateral release lever 36 pivotable on the tilt housing engages a lug 38 on the lock shoe to pivot the lock shoe for release from the pin.

The steering column 10 further includes an upper steering shaft 40 connected by a universal joint 42 to the steering shaft 24 for rotation with the latter and for relative articulation about the lateral centerline of the steering column. The upper steering shaft 40 has a cylindrical first segment 44 and a smaller diameter cylindrical second segment 46. A steering wheel 48, FIG. 1, is rigidly attached to the upper steering shaft 40 outside of the tilt housing 30. The vertical position of the steering wheel 48 is adjusted by up and down pivotal movement of the tilt housing about the lateral centerline of the steering column.

The upper steering shaft 40 is supported on the tilt housing 30 by a first bearing 50 and by a second bearing 52 for rotation about the centerline 32 of the tilt housing. A longitudinal centerline, not shown, of the upper steering shaft is coincident with the centerline 32 of the tilt housing. The first bearing 50 includes an inner race 54 on the first segment 44 of the upper steering shaft 40 abutting an annular shoulder 56 on the latter, an outer race 58 abutting an annular shoulder 60 on the tilt housing 30, and a plurality of rolling elements 62. The second bearing 52 includes an inner race 64 on the first segment 44 of the upper steering shaft 40, an outer race 66 abutting an annular shoulder 68 on the tilt housing 30, and a plurality of rolling elements 70. A retainer 72 according to this invention prevents dislodgment of the upper steering shaft 40 from the second bearing 52 and, therefore, from the tilt housing 30.

Figure 3:
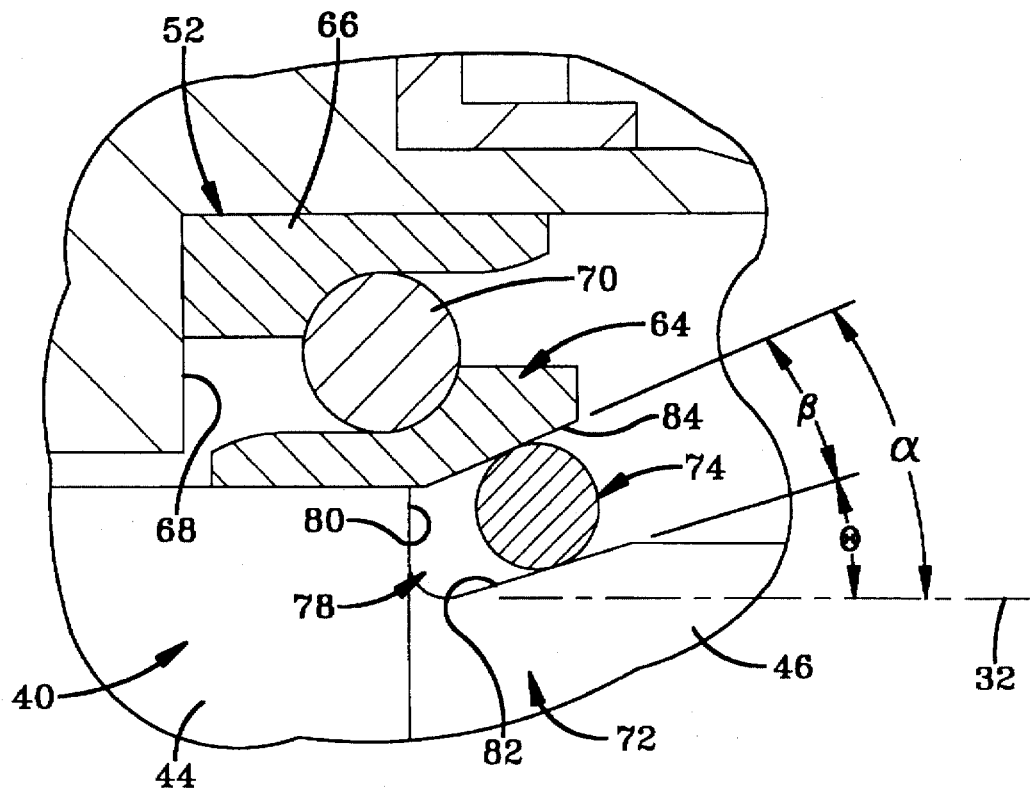
FIG. 3 is an enlarged view of the portion of FIG. 2 in the reference circle 3.
Figure 4:
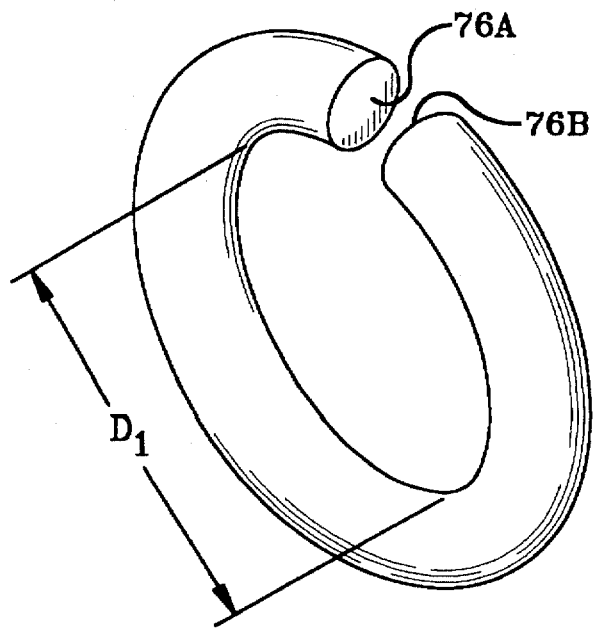
FIG. 4 is a perspective view of a retaining ring of the retainer according to this invention.

Referring to FIGS. 2–4, the retainer 72 includes a radially expandable retaining ring 74 having a pair of facing ends 76A, 76B separated by a gap in the ring and an inside diameter $D_1$. The retaining ring is fabricated from elastically flexible metal wire of circular cross section, FIGS. 3–4. The inside diameter $D_1$ of the retaining ring 74 is smaller than an outside diameter $D_2$ of the second segment 46 of the upper steering shaft 40, FIG. 1. When the ends 76A, 76B of the retaining ring are spread apart to radially expand the ring beyond its inside diameter $D_1$, the elasticity of the metal wire from which the ring is made induces restoring forces urging re-establishment of the inside diameter $D_1$.

A circumferential groove 78 in the second segment 46 of the upper steering shaft 40 has an annular side 80 in a plane generally perpendicular to the centerline 32 of the tilt housing and a frustoconical side 82 converging toward the centerline 32 at an angle θ. A frustoconical sidewall 84 of the inner race 64 of the second bearing 52 faces the frustoconical side 82 of the circumferential groove 78 and overlaps the groove, i.e., extends beyond the plane of the annular side 80. The frustoconical sidewall 84 converges with the centerline 32 of the tilt housing 30 at an angle $\alpha$ which is greater than the angle $\theta$ so that the frustoconical sidewall 84 and the frustoconical side 82 cooperate in defining an annular V-shaped retaining ring groove, the sides of which converge at an angle $\beta$ equal to the difference between the angles $\theta$ and $\alpha$.

The retaining ring 74 is installed by spreading apart the ends 76A, 76B of the ring until its inside diameter exceeds the diameter $D_2$ of the second segment 46 of the upper steering shaft and then releasing the retaining ring in the groove 78 around the frustoconical side 82 of the latter. The aforesaid restoring force induced by spreading apart of the ends 76A, 76B squeezes the retaining ring against the frustoconical side 82 and causes the ring to slide along the frustoconical side toward the bottom of the circumferential groove 78. Prior to attaining the bottom of the groove 78, the retaining ring 74 achieves a seated position, FIGS. 2–3, in the V-shaped retaining ring groove tightly wedged between the frustoconical side 82 and the frustoconical bearing sidewall 84.

In its seated position, the retaining ring engages the frustoconical side 82 and the frustoconical sidewall 84 in line-to-line contact where the cross section of the retaining ring is tangent to the frustoconical side 82 and to the frustoconical sidewall 84. The restoring force of the retaining ring 74 is converted by the frustoconical side 82 and the frustoconical sidewall 84 into thrust between the upper steering shaft 40 and the bearing inner race 64 which, in cooperation with the shoulders 56, 60 and 68, eliminates lash between the upper steering shaft and the tilt housing 30 parallel to and perpendicular to the centerline 32 of the tilt housing.

The retaining ring 74 also prevents the upper steering shaft 40 from being dislodged from the tilt housing 30 by an impact on the steering wheel 48. Such impacts induce forces on the upper steering shaft 40 in the direction of the centerline 32 of the tilt housing urging linear translation of the frustoconical side 82 of the groove 78 toward the frustoconical sidewall 84 of the bearing inner race 64 and consequent squeezing out of the retaining ring 74 from the V-shaped retaining ring groove by radial expansion of the retaining ring to beyond the diameter $D_2$ of the second segment 46 of the upper steering shaft. The angle $\beta$ of convergence of the sides of the V-shaped retaining ring groove, however, is selected in conformance with angle of friction principles to positively foreclose such squeezing out of the ring from the V-shaped retaining ring groove.

According to angle of friction principles, friction between the retaining ring 74, the frustoconical side 82 of the groove 78, and the frustoconical sidewall 84 of the bearing inner race 64 will positively prevent the retaining ring from being squeezed out of the V-shaped retaining ring groove when the angle $\beta$ is selected from a range of angles whose tangents are less than the static coefficient of friction between the retaining ring 74, the frustoconical side 82, and the frustoconical sidewall 84. In an embodiment of the retainer 72 where the retaining ring 74, the inner bearing race 64, and the upper steering shaft 40 are made of steel having a static coefficient of friction is about 0.14, the angle $\beta$ of convergence of the sides of the V-shaped retaining ring groove is 5.5°, i.e., an angle selected from a range of between 0° and about 8°, and the angles $\theta$ and $\alpha$ are about 17° and 22.5°, respectively.

We claim:

1. A retainer between a shaft and a bearing having an inner race disposed on said shaft comprising:

a circumferential groove in said shaft having a frustoconical side converging at a first angle $\theta$ relative to a longitudinal centerline of said shaft, a frustoconical sidewall on said bearing inner race converging at a second angle $\alpha$ relative to said longitudinal centerline of said shaft greater than said first angle $\beta$ overlapping said circumferential groove in said shaft and cooperating with said frustoconical side of said groove in defining an annular V-shaped retaining ring groove, and a radially expandable retaining ring having a seated position in said V-shaped retaining ring groove wherein a restoring force of said retaining ring tightly wedges said retaining ring in said V-shaped retaining ring groove to eliminate lash between said shaft and said bearing, said angles $\theta$ and $\alpha$ being selected to achieve an angle of convergence $\beta$ between said frustoconical side of said circumferential groove and said frustoconical sidewall of said bearing inner race in a range of angles the tangents of which do not exceed the static coefficient of friction between said retaining ring and each of said bearing and said shaft to prevent said retaining ring from being squeezed out of said V-shaped retaining ring groove by a force on said shaft in the direction of said longitudinal centerline thereof.

2. The retainer between a shaft and a bearing having an inner race disposed on said shaft recited in claim 1 wherein:

said radially expandable retaining ring is made from a metal wire having a circular cross section and includes a pair of ends facing each other on opposite sides of a gap in said retaining ring.

3. The retainer between a shaft and a bearing having an inner race disposed on said shaft recited in claim 2 wherein:

each of said bearing inner race and said shaft and said retaining ring is made of steel so that the static coefficient of friction between said retaining ring and each of said bearing inner race and said shaft is about 0.14, and said angle of convergence $\beta$ between said frustoconical side of said circumferential groove and said frustoconical sidewall of said bearing inner race is in a range of between 0° and about 8°.

* * * * *